United States Patent [19]
Kirkland

[11] 4,010,941
[45] Mar. 8, 1977

[54] VARIABLE RATE VEHICLE SUSPENSION

[76] Inventor: Arthur C. Kirkland, 4015 Sturtevant, Detroit, Mich. 48204

[22] Filed: Oct. 30, 1975

[21] Appl. No.: 627,374

[52] U.S. Cl. .......................... 267/57; 280/106.5 R; 280/721
[51] Int. Cl.² .......................................... F16F 1/14
[58] Field of Search ..................... 267/57, 154; 280/106.5 R, 695, 700, 721, 684, 664

[56] References Cited
UNITED STATES PATENTS

| | | | |
|---|---|---|---|
| 3,212,789 | 10/1965 | Stotz | 280/721 |
| 3,752,246 | 8/1973 | Sullivan | 280/106.5 R |
| 3,844,583 | 10/1974 | Sakow et al. | 267/57 |
| 3,918,739 | 11/1975 | Kirkland | 267/57 |

Primary Examiner—James B. Marbert
Attorney, Agent, or Firm—Peter A. Taucher; John E. McRae; Nathan Edelberg

[57] ABSTRACT

A variable rate vehicle suspension comprising a torsion bar having one end anchored to a road arm and the other end anchored to the vehicle sprung mass. Additional anchorage elements are located at spaced points along the torsion bar length. Power actuators selectively move the additional anchorage elements into operative connections with the torsion bar in accordance with the expected load to be carried by the vehicle.

8 Claims, 5 Drawing Figures

VARIABLE RATE VEHICLE SUSPENSION

The invention described herein may be manufactured, used, and licensed by or for the Government for governmental purposes without payment to me of any royalty thereon.

BACKGROUND AND SUMMARY OF THE INVENTION

Vehicle suspensions sometimes utilize torsion bars to resiliently carry the sprung mass in a reasonably stable level attitude in spite of terrain irregularities and vehicle inertia forces. Commonly one end of each torsion bar is anchored to the road arm, and the other end is anchored to the sprung mass. The weight of the vehicle sprung mass imposes a pre-load force on the bar tending to twist the bar in wind-up fashion.

During travel over bumps the road wheel tends to move upwardly relative to the sprung mass; inertia forces in the sprung mass keep the sprung mass in a relatively stable attitude so that the bump stress is absorbed as an increased wind-up twist in the bar. During travel over holes and depressions the road wheel moves downwardly relative to the sprung mass; the bar tends to untwist or torsionally relax, while continuing to suspend the sprung mass. The torsion bar minimizes vertical excursions of the sprung mass while permitting relatively wide random up-down movements of the road wheels.

Each torsion bar of a given length has a particular torsional deflection rate, sometimes expressed as angular deflection (in degrees) per applied force (in pounds). A given length torsion bar used to suspend a relatively light vehicle will therefore undergo comparatively small total deflection as compared to the same bar when used to suspend a relatively heavy vehicle. Particularly in trucks or trailers a problem arises when the sprung mass varies widely from one trip to the next. For example, the sprung mass of an unloaded trailer may be appreciably less than one half the sprung mass of the loaded trailer, so that a given torsion bar designed to provide satisfactory wheel travel when the vehicle is unloaded will permit the vehicle to "bottom-out" when the same vehicle is loaded; conversely if the torsion bar is designed to provide satisfactory wheel travel when the vehicle is loaded then it will provide insufficient wheel travel when the vehicle is unloaded.

The present invention provides a mechanism for effectively varying the length of a torsion bar so that the same bar can provide satisfactory wheel travel whether the vehicle is loaded or unloaded. The torsion bar length is effectively varied by means of retractible anchorages located at spaced points along the torsion bar length. When the vehicle is unloaded the entire torsion bar length is utilized. Before the vehicle is loaded an auxiliary anchorage mechanism is actuated to anchor the bar at an intermediate point, thereby effectively shortening the torsion bar.

THE DRAWINGS

Figure 1:
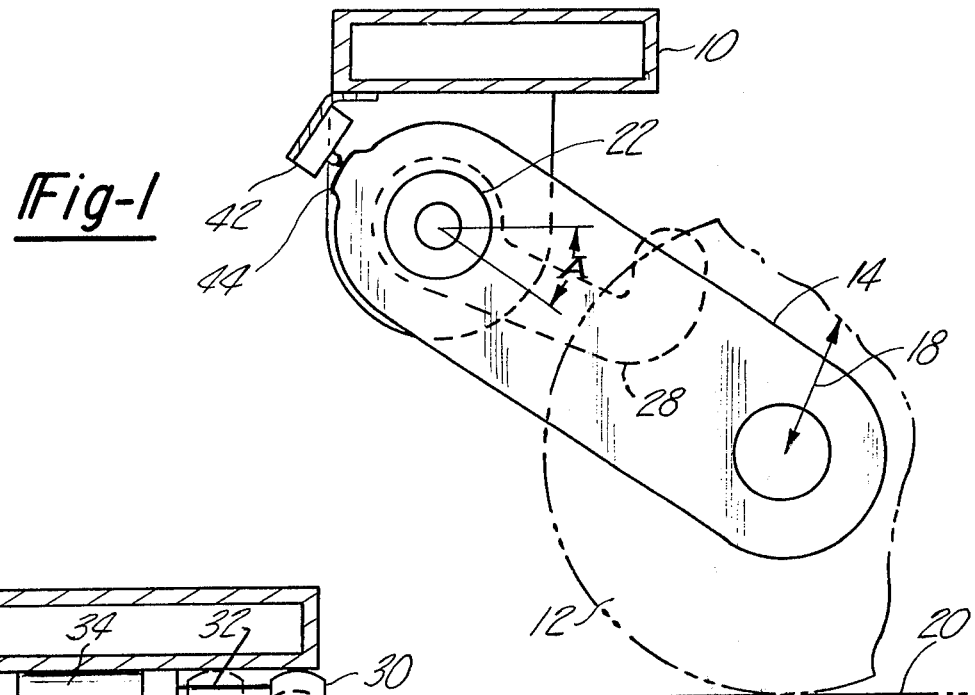
FIG. 1 is a fragmentary side elevational view of a vehicle suspension system incorporating this invention.

FIG. 1 fragmentary illustrates a vehicle that includes a sprung mass 10 and road wheel 12. Three or more other road wheels are not shown. A road wheel arm 14 is mounted in bearings 16 (FIG. 2) to enable the road wheel to travel up and down over terrain 20 in the arrow 18 direction according to terrain changes and irregularities.

Figure 2:
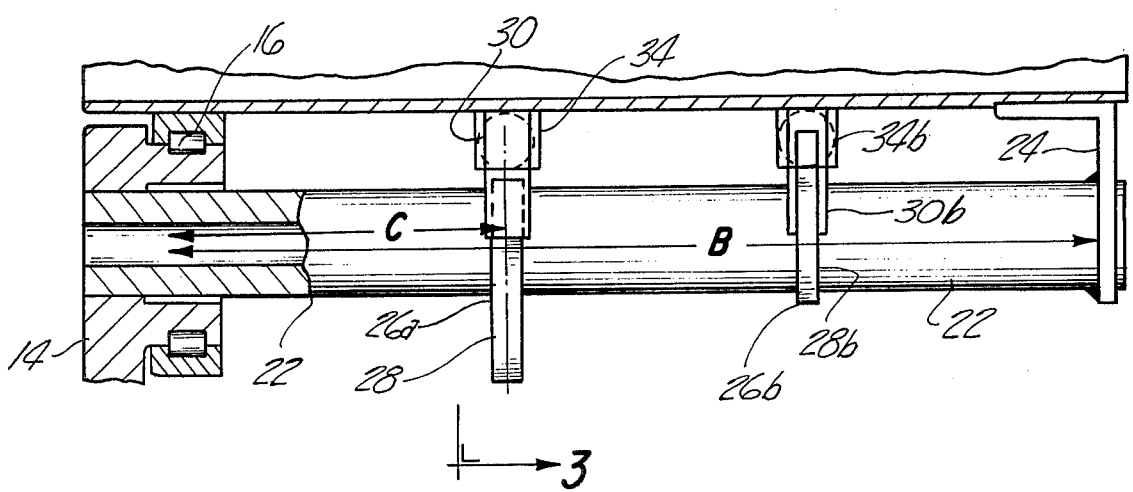
FIG. 2 is an end elevational view of the FIG. 1 system.

Sprung mass 10 is resiliently supported or suspended by means of a tublar torsion bar 22 which extends from road arm 14 to a remote anchorage 24 (FIG. 2). In the installed position the torsion bar is twisted by the sprung mass. As the road wheel deflects upwardly relative to the sprung mass the twist in the bar is increased; as the road wheel traverses a depression in the terrain the torsion bar tends to untwist or relax. The bar has a torsional resilience such that upward movement of road arm 14 through an angle of A degrees produces sufficient road wheel deflection to enable the torsion bar to absorb most of the anticipated road shock. In a typical situation the total angular travel of the road arm might be on the order of forty degrees, and the total upward deflection of the road wheel might be approximately 10 inches.

The torsion bar material and dimensions are selected so that a desired road wheel travel is obtained under all load conditions. In general, only part of the bar length is torsionally utilized when the vehicle is fully loaded; the full bar length is torsionally utilized when the vehicle is empty. With such an arrangement each unit length of the bar is torsionally loaded to a lesser extent when the vehicle is empty and to a greater extent when the vehicle is loaded, as required for optimum suspension performance. When fully loaded, a given vehicle might have a weight two or three times its unloaded weight. To provide desired suspension resilience for the vehicle under varying load conditions the torsion bar is provided with one or more auxiliary anchorages 26a, 26b, etc. spaced along the length of the bar. As seen in FIG. 2, anchorage 26a is operatively engaged with torsion bar 22; anchorage 26b is retracted to an inoperative standby condition. The length of the torsion bar is effectively reduced from a value of B inches to a value of C inches.

Figure 3:
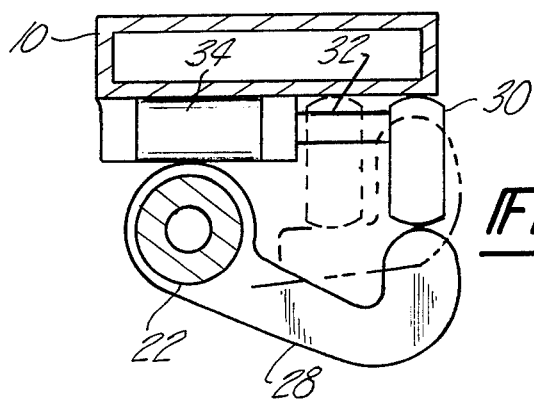
FIG. 3 is a fragmentary sectional view taken on line 3—3 of FIG. 2.

As seen best in FIG. 3, auxiliary anchorage 26a comprises a force arm 28 affixed to torsion bar 22 and an abutment 30 carried by the piston rod 32 of a fluid cylinder 34; the cylinder is suitably affixed to sprung mass 10. When pressure fluid is introduced into the left end of cylinder 34 the abutment 30 is moved normal to the torsion bar from an inactive retracted position (shown in dotted lines) to an operative position (shown in full lines). Introduction of pressure fluid into the right end of cylinder 34 moves the abutment 30 back to its retracted position. Fluid cylinder actuation is carried out only while arm element 28 is in its full line position (FIG. 3), i.e. while the vehicle is unloaded.

FIG. 3 illustrates two conditions of arm element 28. The full line condition occurs when the element 28 is being used. The dotted line condition occurs when the element 28 is inactive. Assuming the vehicle to be unloaded, fluid cylinder 34 will be pressurized to locate abutment 30 in its retracted (dotted line) position. Arm element 28 will then be free to move upwardly from its full line position about the axis of torsion bar 22; element 28 is then inactive as an anchorage mechanism during the useful road wheel arm travel. The torsion bar system then has a relatively low spring rate (load in pounds per unit angular deflection of the bar).

Prior to loading the vehicle with cargo or personnel the fluid cylinder 34 is pressurized to move abutment 30 into its full line position. During the cargo loading operation abutment 30 intersects the normal movement path of arm 28, thereby preventing upward deflection of arm 28; the arm thereby becomes effective as an anchorage element for the torsion bar after the vehicle has been loaded with cargo and/or personnel.

When abutment 30 is in its full line "engaged" position and the vehicle is loaded, the portion of the torsion bar to the right of anchorage 26a (FIG. 2) is effectively removed from the system. The effective length of the torsion bar is then reduced to a value of C inches. Total upward angular deflection of the road arm 14 through angle A (FIG. 1) occurs through a lesser distance c so that each inch length of the bar experiences an increased torsional stress and deflection (compared to the situation when the bar has an effective length of B inches). The increased torsional stress and deflection of each inch of the bar means that the bar is able to resiliently support the increased sprung mass without any undesired bottoming out of the vehicle. The system is then a stiffer system having a higher spring rate (load in pounds per unit angular deflection of the bar).

As shown in FIG. 2 there are two auxiliary anchorage mechanisms 26a and 26b. Mechanism 26a would be activated when it was expected that the vehicle would be loaded to its full weight capacity. Mechanism 26b would be activated when it was expected that the vehicle would be partially loaded. Each auxiliary anchorage mechanism includes a fluid cylinder 34 or 34b for positoning the associated abutment 30 or 30b in the retracted or active position.

Figure 4:
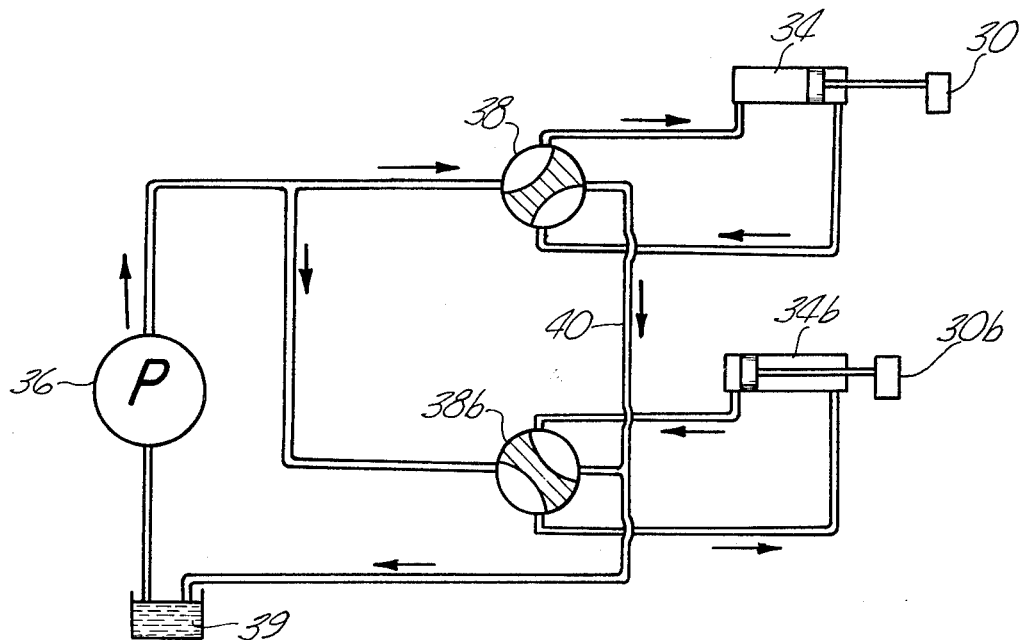
FIG. 4 is a schematic illustration of a fluid energizer circuit for certain fluid cylinders used in the FIG. 1 embodiment.

FIG. 4 schematically illustrates one hydraulic circuit for energizing the fluid cylinders 34 and 34b. As shown, pump 36 delivers pressure fluid through valve 38 to the left end of cylinder 34; fluid is exhausted from the right end of the cylinder through the other ports in valve 38, and thence to the sump 39 through drain line 40. Pump 36 also delivers pressure fluid through valve 38b to the right end of cylinder 34b; fluid is exhausted from the left end of cylinder 34b through valve 38b, and thence to the sump.

Each valve 38 or 38b may be a four way valve operated in the "actuate" direction by an electric motor and in the "retract" direction by a spiral coil spring (when the motor is deenergized). At any one moment only one of the valve should be in position to activate the associated abutment 30 or 30b. Therefore the motors for the valves are controlled by a system of switch contacts arranged so that closure of one set of contacts automatically opens the other set of contacts.

Valves 38 or 38b are to be actuated only when the vehicle is in an unloaded condition; otherwise when the vehicle is loaded in arm 28 (FIG. 3) could interfere with movement of the associated abutment 30. To ensure the desired control there may be provided a normally open control switch 42 (FIG. 1 and 5) having an actuator plunger ridable on the surface of road arm 14. A cam 44 on the road arm operates the switch to the circuitclosed condition only when the road arm is in the "depressed" position occurring when the vehicle is unloaded.

Figure 5:
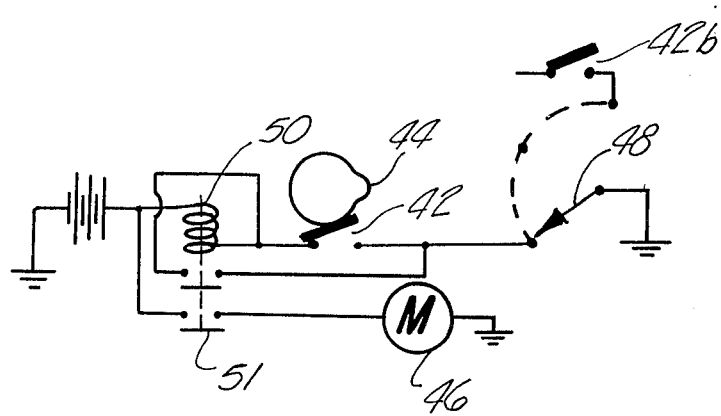
FIG. 5 is a schematic illustration of an electrical control circuit for locking out certain valves used in the FIG. 5 fluid system.

FIG. 5 illustrates a circuit utilizing a manual selector switch 48 and cam-operated switch 42 as a master control for valve motor 46. With switch 42 in a circuit-closed condition and manual selector switch 48 in its illustrated position relay 50 is operated so that relay contacts 51 energize motor 46. When energized the motor moves the associated valve to the position of valve 38 in FIG. 4, thereby locating abutment 30 in the "operative" position where it functions as an anchorage for the torsion bar.

Selector switch 48 can be moved to two non-illustrated positions. In one of those positions both valves 38 and 38b are deenergized so that both abutments 30 and 30b are retracted; the full length of the torsion bar is then effectively utilized, as when the vehicle is unloaded. In the other non-illustrated position of switch 48 a relay and motor (similar to relay 50 and motor 46) are energized through a cam-operated switch 42b; a major portion of the torsion bar is then effectively utilized, as when the vehicle is partially loaded.

The torsion bar system shown in the drawings is similar in some respects to the system shown in U.S. Pat. No. 3,844,583 issued to T. Sakow et al on Oct. 29, 1974. Thus, both systems comprehend means for adjusting the effective length of a torsion bar in accordance with variations in the sprung mass. However, in applicant's system the length adjustment is accomplished by one or more retractible anchoring mechanisms stationed at spaced points along the bar length. In the Sakow et al system the length adjustment is accomplished by an anchoring block 28 arranged in a fixed tube 11 that surrounds the torsion bar; manual slidable repositionment of the anchoring block along the inner surface of the fixed tube changes the anchorage point for the torsion bar.

Applicant believes his system to be advantageous over the system devised by Sakow et al in respect to relative ease of adjustment. In Sakow et al the anchoring block 28 must slide on a torsion bar that is twisted by the preload force delivered to the bar from the sprung mass. The twist in the bar will inevitably exert a binding action on block 28 tending to prevent easy movement of the block along the bar. It should also be noted that in the Sakow et al system the anchor block must simultaneously slide on the outer surface of torsion bar 16 and the inner surface of square tube 11. It is difficult for the anchoring block to have a helical "corkscrew" movement along bar 16 without binding either against the bar or the tube.

In applicant's proposed arrangement the retractible abutment elements 30, 30b, etc. move normal to the torsion bar rather than along the bar surface. Accordingly the twist imparted to the bar by the sprung mass has no tendency to interfere with the length adjustment function.

It should also be noted that the Sakow et al method of adjustment requires that the torsion bar have a rectangular (or other non-circular) cross section; this is necessary so that the anchor block can key on the torsion bar surface and otherwise act as a thrust-absorption element. On the other hand, applicant's arrangement permits a round torsion bar to be used. A round bar structure is less likely to develop high stress concentrations; additionally a greater portion of the bar cross section is usefully employed. In the rectangular cross sectioned bar of Sakow et al the stresses and deflections are different at different points measured from the bar axis. Bar portions near the axis deflect only slightly while bar portions remote from the axis (i.e. at its upper and lower edges) deflect to a much greater extent, thereby leading to high localized stresses and internal stress concentrations. The round tube usable by applicant has generally uniform stress and strain around its circumference.

One further advantage of the system proposed by applicant is the capability for changing the effective length of the bar from a remote point such as the cab of the vehicle. Thus, applicant's push button switches 48 can be located on a panel in the cab for convenient actuation by the driver as conditions may require; there is no necessity for the driver to crawl under the vehicle to reposition an anchorage element, as is the case in the Sakow et al system.

I wish it to be understood that I do not desire to be limited in the exact details of construction shown and described for obvious modifications will occur to a person skilled in the art.

I claim:

1. In a road vehicle having a sprung mass, road wheel means deflectable toward and away from the sprung mass in accordance with terrain irregularities, resilient torsion bar means for suspending the sprung mass from the road wheel means, first means anchoring one end of each torsion bar to the road wheel means, and second means anchoring the other end of each torsion bar to the sprung mass; said first and second anchoring means exerting a wind-up effect on the bar as the road wheel moves from its minimum load condition upwardly toward the sprung mass, and a relaxation effect on the bar as the road wheel moves downwardly away from the sprung mass toward the minimum load condition, whereby the suspension system has a positive spring rate related to the torsional deflection characteristic of the bar: the improvement comprising at least one auxiliary anchoring means stationed between the two previously mentioned anchoring means to anchor an intermediate section of the bar against rotational deflection when the vehicle is in the maximum load condition; each auxiliary anchoring means comprising a thrust absoprtion element operatively engageble with the intermediate section of the bar, and power means for retracting the thrustabsorption element to a position completely disengaged from the bar.

2. In the vehicle of claim 1: said thrust-absorption element being retractible in a direction normal to the torsion bar rotational axis.

3. In the vehicle of claim 2: said power means comprising a fluid cylinder.

4. In the vehicle of claim 1: said thrust absorption element comprising an abutment element, the intermediate section of the torsion bar having a force arm affixed thereto, said abutment element and force arm being located in a common place extending transverse to the torsion bar rotational axis; the aforementioned power means being connected to the abutment element for moving same between a first operating position intersecting the movement path of the force arm and a second retracted position outside the movement path of the force arm.

5. In the vehicle of claim 4: said power means comprising a fluid cylinder affixed to the vehicle sprung mass and a piston affixed to the abutment element.

6. In the vehicle of claim 5: said fluid cylinder being located so that its piston has a movement direction generally normal to the movement direction of the force arm.

7. In the vehicle of claim 1: and further comprising control means responsive to road wheel deflection for preventing the power means from being energized except when the torsion bar is in a relatively relaxed condition.

8. In the vehicle of claim 1: said thrust absorption element comprising an abutment element; the intermediate section of the torsion bar having a force arm affixed thereto, said abutment element and force arm being located in a common place extending transverse to the torsion bar rotational axis; the aforementioned power means comprising a fluid cylinder affixed to the vehicle sprung mass, and a piston affixed to the abutment element; said fluid cylinder being located so that its piston moves the abutment element across the movement path of the force arm, whereby the abutment element is alternately located in a first operating position intersecting the force arm's movement path and a second inactive position outside the force arm movement path; and control means responsive to road wheel deflection for pressurizing the fluid cylinder so that the abutment element is retained in its inactive position except when the road wheel means is at the minimum load condition.

* * * * *